United States Patent Office 2,738,283
Patented Mar. 13, 1956

2,738,283

COPPER BEARING ANTIFOULING SHIPBOTTOM PAINTS

William H. Furness, Haddonfield, N. J., assignor to Copper Research, a corporation of New Jersey No Drawing. Application August 20, 1952, Serial No. 305,499

3 Claims. (Cl. 106—17)

The method herein described for improved antifouling shipbottom paints is based on my discovery that cupric hydroxide, $Cu(OH)_2$, has a higher degree of toxicity than other copper compounds when used for antifouling purposes, and may be employed in smaller quantities, thereby providing a means for saving large amounts of copper which are now lost by excessive leaching into the sea.

This application is a continuation-in-part of my earlier filed application, Serial Number 224,840, filed May 5, 1951, now U. S. Patent 2,666,688; which patent is directed to a method for making stable cupric hydroxide.

Cuprous oxide ($Cu_2O$) has been employed for many years as the standard toxic agent in antifouling paints, and extensive scientific research has been carried out and reported in the literature, the result of which has been to establish requirements for the successful use of this material. One of these requirements relates to the leaching rate or quantity of copper which must be discharged from the paint surface into the sea in order to prevent fouling attachments. The minimum effective leaching rate of copper from cuprous oxide paints has been proven to be 10 micrograms per sq. cm. of paint surface per day. The amount of copper necessary to establish and maintain this leaching rate for one year is represented by about 4.3 lbs. cuprous oxide per gallon of paint, and it is common practice to employ 6 to 8 lbs. cuprous oxide in antifouling paints for use in tropical waters.

It has been assumed by scientists and others familiar with the art that cupric hydroxide, on account of its very low solubility (one four hundredth that of cuprous oxide) would be useless as an antifouling agent. Consequently it has not heretofore been tried for the purpose. I have discovered that the toxicity of cupric hydroxide is so much greater than that of cuprous oxide that its use in antifouling paints is very effective, and that its low solubility is an advantage in preventing excessive leaching into the sea.

Extensive tests with panels coated with cupric hydroxide bearing paints immersed in the sea in fouling waters for many months prove that cupric hydroxide paints containing one sixth to one third the copper content of standard cuprous oxide paints are equally effective in preventing fouling.

For example: Panels coated with cupric hydroxide paint containing .63 lb. copper per gallon, spread at the rate of 500 sq. ft. per gallon show no fouling after five and one half months of exposure. Panels coated with cupric hydroxide paint containing 1.23 lbs. copper and spread at the rate of 500 sq. ft. per gallon show no fouling after ten and one half months of exposure. These two samples are representative of a large variety of formulations containing cupric hydroxide as the toxic agent which I have placed on exposure in the ocean during the past 18 months, all of which have so far resisted fouling attachment. The fouling intensity at the place of exposure of my experimental cupric hydroxide panels is such that the reverse side of each panel, which carries no toxic agent, is in every case heavily encrusted with barnacles and other fouling organisms.

The examples given in the preceding paragraph demonstrate the greater toxicity of cupric hydroxide as compared to that of cuprous oxide and show that due to this higher toxicity a leaching rate much lower than that required in cuprous oxide paints may be employed when cupric hydroxide is used as the toxic agent. I have found that .63 lb. copper per gallon of antifouling paint is sufficient to provide a leaching rate which will prevent fouling when the copper is present in the form of cupric hydroxide, while 3.6 lbs. copper is the quantity accepted in the art as the minimum required to furnish a leaching rate which will prevent fouling when the copper is used in the form of cuprous oxide.

The higher toxicity of cupric hydroxide and its ability to prevent fouling though its leaching rate is many times lower than that of cuprous oxide appears to reside in the greater chemical activity afforded by the two hydroxyl groups it contains. Cupric hydroxide will react directly with fatty acids and many other organic compounds and with all acids to form salts, and dissolves in many alkaline solutions. Cuprous oxide is in comparison only relatively active, requiring additional oxygen to react completely with mineral and organic acids and other organic substances. It is probable, therefore, that cupric hydroxide has a direct toxic action on fouling organisms and its effects are not wholly dependent on the formation of cupric chloride ions as is stated, in the literature, to be the case when cuprous oxide is used as the toxic agent. Due to the high chemical activity of cupric hydroxide it is also possible that the secretions of various fouling organisms cause increased solubility at points of contact resulting in the direct poisoning of the organisms, and not depending solely on the overall leaching rate from the paint surface or the formulation of cupric chloride ions.

Owing to the necessity of exposing experimental test panels in the ocean for many months in order to obtain data concerning performance over the long period of service required for antifouling paints, it has not yet been possible to determine the best vehicle in which to incorporate cupric hydroxide to make the highest grade of such paint. The following specification gives a satisfactory method for manufacturing the cupric hydroxide paint of my invention and discovery:

Substitute cupric hydroxide for cuprous oxide in any of the formulations now used for making cuprous oxide paints.

EXAMPLE 1

(To make 100 gallons)

| | Pounds |
|---|---|
| Rosin | 277 |
| Fish oil | 118 |
| Zinc stearate | 18 |
| Cupric hydroxide | 100 |
| Zinc oxide | 161 |
| Magnesium silicate | 56 |
| Solvent naphtha | 241 |

The above composition is formula 105, Cold Plastic, Bureau of Ships, except that 100 pounds of $Cu(OH)_2$ has been substituted for the 589 pounds of $Cu_2O$ specified in the formula. More than 100 pounds of $Cu(OH)_2$ may also be employed in the same formulation. The solvent naphtha in formula 105 is characterized by a specific gravity of from 0.840 to 0.885 at 15.5° C.; distillation of not over 5% below 160° C. and an end point of not over 180° C.; evaporation of 2 ml. in not less than 121 minutes.

EXAMPLE 2

*(To make 100 gallons)*

| | Pounds |
|---|---|
| Zinc oxide | 210 |
| Indian red | 80 |
| Magnesium silicate | 80 |
| Cupric hydroxide | 100 |
| Mercuric oxide | 21 |
| Rosin | 265 |
| Pine oil | 42 |
| Coal tar (80% nonvolatile) | 80 |
| High flash naphtha | 135 |
| Petroleum spirits | 135 |

The above composition is formula 403A of the Maritime Commission except that 100 lbs. of Cu(OH)$_2$ has been substituted for the 425 lbs. of Cu$_2$O specified in the formula.

EXAMPLE 3

The quantity of cupric hydroxide recommended in Examples 1 and 2 are considered, on the basis of results from immersion tests, to be sufficient for paints to be used in temperate latitudes; for paints used in tropical waters two lbs. of cupric hydroxide per gallon of paint or more may be required.

Further advantage of cupric hydroxide resides in the fact that it may be effectively used as an antifouling protective agent by means of blowing or projecting it onto a sticky paint surface which is advantageous in the case of impermeable coatings.

I claim:

1. A method for preventing fouling of shipbottoms which comprises the step of applying to a shipbottom a water-resistant coating containing at least about one pound per gallon of a material toxic to fouling organisms consisting essentially of cupric hydroxide.

2. A composition for preventing fouling of shipbottoms consisting of at least 100 parts by weight of cupric hydroxide, 277 parts by weight of rosin, 118 parts by weight of fish oil, 18 parts by weight of zinc stearate, 161 parts by weight of zinc oxide, 56 parts by weight of magnesium silicate and 241 parts by weight of solvent naphtha.

3. A composition for preventing fouling of shipbottoms consisting of at least 100 parts by weight of cupric hydroxide, 210 parts by weight of zinc oxide, 80 parts by weight of Indian red, 80 parts by weight of magnesium silicate, 21 parts by weight of mercuric oxide, 265 parts by weight of rosin, 42 parts by weight of pine oil, 80 parts by weight of coal tar, 135 parts by weight of high flash naphtha and 135 parts by weight of petroleum spirits.

References Cited in the file of this patent

UNITED STATES PATENTS

| | | |
|---|---|---|
| 824,974 | Chevigny | July 3, 1906 |
| 1,421,914 | Coleman | July 4, 1922 |
| 1,598,982 | Newhall | Sept. 7, 1926 |
| 2,438,511 | McMahon | Mar. 30, 1948 |
| 2,434,291 | Smith | Jan. 13, 1948 |
| 2,489,228 | Rudd | Nov. 22, 1949 |

OTHER REFERENCES

Carriers: Chem. Abstracts, vol. 39, 2840.

Hooker: "Colloidal copper hydroxide as a fungicide," Ind. and Eng. Chem., vol. 15 (1923), pages 1177 and 1178.

Mellor: Comprehensive Treatise on Inorganic and Theoretical Chemistry, vol. 3 (1923), pages 142 and 143.